United States Patent [19]

Leibowitz et al.

[11] Patent Number: 5,308,907

[45] Date of Patent: May 3, 1994

[54] LOW SMOKE POWER CABLE SEALANT

[75] Inventors: Leonard Leibowitz, East Brunswick, N.J.; Robert A. Nosal, Doylestown, Pa.

[73] Assignee: National Starch and Chemical Investment Holding Corporation, Wilmington, Del.

[21] Appl. No.: 957,203

[22] Filed: Oct. 6, 1992

[51] Int. Cl.[5] .......................... C08J 5/10; C08K 3/10; C08L 25/08

[52] U.S. Cl. .................... 524/436; 523/173; 524/430; 524/433; 524/437

[58] Field of Search ............... 523/173; 524/430, 433, 524/436, 437

[56] References Cited

U.S. PATENT DOCUMENTS

| | | | |
|---|---|---|---|
| 3,957,723 | 5/1976 | Lawson et al. | 260/45.75 |
| 4,136,135 | 1/1979 | Lee | 260/874 |
| 4,147,690 | 4/1979 | Rich | 260/45.7 |
| 4,288,360 | 9/1981 | Bobear | 260/37 |
| 4,622,350 | 11/1986 | Icenogle et al. | 523/200 |
| 4,965,309 | 10/1990 | Batdorf | 524/405 |

OTHER PUBLICATIONS

George F. Beekman and Mildred A. Hastbacka, "Magnesium Hydroxide and Basic Magnesium Carbonate Effective Smoke Suppressant Fillers in Halogen–Free EPDM Compounds", presented at the 131st Meeting of the Rubber Division ACS, Montreal, Canada May 26–29, 1987.

*Primary Examiner*—Paul R. Michl
*Assistant Examiner*—V. K. Rajguru
*Attorney, Agent, or Firm*—Edwin M. Szala; Ellen T. Dec

[57] ABSTRACT

Electrical power cables and sealants used in their manufacture are described. The pumpable sealants are manufactured with a smoke suppressant composition comprising a combination of alumina trihydrate ATH and magnesium hydroxide.

8 Claims, No Drawings

LOW SMOKE POWER CABLE SEALANT

This invention relates to electrical power cables and the sealants used in their manufacture. More particularly the invention relates to electrical power cables intended for use particularly in building, marine or in other similar closed environments which are manufactured with low smoke, pumpable sealants (sometimes called fillers) which are used in the manufacture of such power cables.

After installation in closed environments, cable routes are ordinarily inaccessible to inspection or preventive maintenance and for that reason the power cables are designed and manufactured for long-term use. In building or shipboard uses, the power cables must be able to withstand unexpected moisture, steam, oil or chemical leaks. Moreover, on exposure to extreme high temperatures or fire, the power cable must not emit smoke to any harmful degree.

The design and manufacture of electrical power cables is largely carried out according to specifications set out by the purchaser for a specific end-use of the cable in conjunction with specifications developed and provided by relevant associations and agencies. Specifications for power cables used in the United States are provided by a number of governmental and industrial associations and agencies. Power cable specifications can be obtained, for example, from ASTM (American Society of Testing Materials); IEEE (The Institute of Electrical & Electronic Engineers); ICEA-NEMA (Insulated Cable Engineers Association National Electrical Manufacturers Association); and Department of Defense Military Cable Specifications.

For closed cable routes, low smoke generation on exposure of the cable to high heat or fire is a primary concern with stringent requirements. Low smoke generation is closely tied into the sealant or filler used in the manufacture of electrical power cables. Thus, the sealant must exhibit low toxicity and low smoke generation and also possess a pumpable viscosity at application temperatures.

Smoke suppressant technology as it applies to sealants herein is complex. Practitioners skilled in the art have recognized that one smoke suppressant system for a cable sealant cannot be used as a system in all such sealants. A smoke suppresbant system useful in one cable sealant may be significantly less useful or ineffective in another cable sealant. Relevant patent literature includes:

U.S. Pat. No. 3,957,723 to Lawson et al issued May 18, 1976 teaches the use of a combination of aluminum oxide trihydrate and zinc oxide to synergistically decrease the flammability of polyvinyl chloride and the maximum smoke intensity generated by burning PVC.

U.S. Pat. No. 4,622,350 to Icenogle et al issued Nov. 11, 1986 teaches a magnesium hydroxide filled, rubber modified, functionalized low molecular weight polypropylene and wax-containing polypropylene composition having good physical properties and processability, good flame retardancy and low production of toxic corrosive gases when burned.

U.S. Pat. No. 4,965,309 to Batdorf issued Oct. 23, 1990 discloses a smoke suppressant additive for halogen containing plastic capable of reducing the smoke development of the plastic which comprises about (i) 1 to 8 parts zinc present as an inorganic compound (ii) 1 to 6 parts magnesium compound present as an inorganic magnesium compound other than magnesium oxide, (iii) 0.7 to 7 parts molybdenum present as an inorganic molybdenum compound, and (iv) 0 to 0.7 parts copper present as an inorganic copper compound; all parts by weight based upon the total amount of the elements zinc, magnesium, molybdenum and copper in the composition.

An article presented at the 131st Meeting of the Rubber Division ACS, Montreal Canada, May 26-29, 1987 by George F. Beekman and Mildred A. Hastbacka entitled "Magnesium Hydroxide and Basic Magnesium Carbonate, Effective Smoke Suppressant Fillers In Halogen-Free EPDM Compounds" discloses combinations of magnesium hydroxide and basic magnesium carbonate as total or partial replacements of alumina trihydrate (ATH) in a test EPDM formulation. The authors observed that formulations with combinations of ATH and magnesium hydroxide produced less smoke than compounds filled with the same loading of either alone.

Reports of synergism between ATH and magnesium hydroxide with respect to flame retardancy have appeared in patent literature. See, for example, U.S. Pat. Nos. 4,288,360; 4,147,690; 4,136,135 and Jap. Pat. 78-38082.

Present sealants available in commerce meeting the requirements with respect to the military specifications are based on silicon rubber polymers which will inherently show a low tendency to smoke on exposure to fire and high temperatures.

A need exists for a low-cost, non-silicon, low smoke power cable sealant capable of use in electrical power cables which sealant possesses low toxicity provided by the absence of halogens and a pumpable viscosity (i.e. be readily extrudable).

SUMMARY OF THE INVENTION

We have discovered a sealant for use in the manufacture of electrical power cables which possesses useful physical properties including a viscosity which permits pumpability of the sealant, and additionally is capable of meeting Military specifications Mil-C-0024643 and has a smoke index below 45 as measured by test procedure NES-711.

The pumpable sealant composition of the invention comprises
  (a) about 3 to 10% of a styrene-containing hydrogenated diblock and/or triblock copolymer
  (b) about 70 to 82% of a smoke suppressant composition
  (c) about 10 to 20% of petrolatum or mineral oil
  (d) from 0 to about 3% of an organic plasticizer for block copolymer
  (e) from 0 to about 1% of a stabilizer
  (f) from 0 to about 5% of a smoke suppressant additive.

All percentages are by weight.

The viscosity of the sealant must be in the range which permits the sealant to be pumped during use in the manufacture of the power cable. Application temperature of the sealant in the manufacture of the power cable is usually in the range of 200°-250° F. Ordinarily only minor adjustments either in components or amounts will be needed to provide a sealant viscosity within the required range. Sealant compositions formulated with components employed within the above ranges will meet Military specifications Mil-C-0024643 relating to low smoke emission and exhibit a smoke index less than 45 as measured employing NES 711 (Naval Engineering Standard) as mandated by the military specification.

In a further aspect the invention relates to an electrical power cable having low smoke properties employing the above described sealant. In this aspect, the invention relates to a water tight, electrical power cable comprising a conductive cable core, insulation, low smoke sealant and jacketing.

DETAILED DESCRIPTION OF THE INVENTION

The polymeric component of the sealant is provided by a styrene-containing, hydrogenated diblock and/or triblock copolymer. The hydrogenated block copolymers utilized herein are represented generally by the configurations A-B or A-B-A where the polymer blocks A are non-elastomeric styrene blocks which as homopolymers have glass transition temperatures above 20° C., and the polymer blocks B are elastomeric butadiene blocks which are partially or substantially hydrogenated and or otherwise referred to as ethylene-butylene blocks. Representative examples of such block copolymers include styrene-ethylene-butylene-styrene (SEBS), styrene-ethylene-propylene-styrene (SEPS), isoprene-styrene (SIS), styrene-butadiene-styrene (SBS). Each of the above copolymers when utilized in the sealant will provide certain desirable properties to a greater or lesser extent. Thus, use of SEPS, for example, will generally result in useful compositions which, however, may exhibit poorer tensile strength in comparison with others. The copolymers may be prepared using methods taught, for example, in U.S. Pat. Nos. 3,239,478; 3,427,269; 3,700,633; 3,753,936; and 3,932,327. Alternatively they may be obtained from Shell Chemical Co. under the Kraton ® trademark. Some copolymers are available from Kuraray Co., Ltd., Tokyo and Osaka under the Septon trademark. Depending on the desired properties required for a specific application, one or a mixture of two or more of the diblock, triblock copolymers may be employed. In our preferred sealant, the preferred copolymer is SEBS available from Shell as Kraton ® G-1652.

Other materials which may be substituted for the styrene containing diblock and/or triblock copolymers include elastomers such as EPR (ethylene propylene monomer) and EPDM (ethylene propylene diene monomer) which are available commercially from a number of suppliers including Exxon and du Pont de Nemours. These elastomers are known to behave in similar manner to the diblock/triblock copolymers and it is expected that useful sealants meeting the noted specifications can be prepared therewith.

The amount of copolymer employed in the sealant may range from about 3 to 10% by weight of the total sealant composition. The amount used will vary depending on the specific copolymer selected and will have a strong effect on cohesive strength and viscosity of the sealant. Preferred sealants will ordinarily utilize the copolymer in an amount from 4 to 6% by weight of the total sealant composition.

The smoke suppressant composition used herein comprises a mixture of alumina trihydrate (ATH) and magnesium hydroxide employed in proportions of 4:1 to 1:4 and preferably 2:1 to 1:2. While each of these materials used alone is an effective smoke suppressant, combinations of the two used in our described sealants provide increased smoke suppressant properties as compared to use of either alone. Magnesium hydroxide differs from alumina trihydrate in decomposition temperature, 320° C. and 230° C. respectively, and chemical composition. Our most preferred sealants employ the smoke suppressant as a 1:1 alumina trihydrate:magnesium hydroxide combination.

The amount of smoke suppressant composition employed in the sealant may vary from about 70 to 82 parts by weight of the total sealant composition. Higher concentration of suppressant within the above range provide higher smoke suppressant properties and preferred sealants will contain a minimum of 72% by weight of the suppressant combination.

The sealants herein utilize petrolatum or mineral oil in an amount ranging from 10 to 20% by weight of the total sealant composition. Petrolatum, sometimes called paraffin jelly, is a yellowish to light-amber or white, semisolid mass at room temperature. The commercial material, available in U.S.P. and technical grades, is a purified mixture of semisolid hydrocarbons. Mineral oil, a mixture of liquid hydrocarbons derived from petroleum, is also available in U.S.P. and technical grades. The term mineral oil is intended to include naphthenic and paraffinic process oils as full equivalents. Preferred sealants utilize about 14–18% of petrolatum or mineral oil.

A plasticizer for the block copolymers may be used to impart an increased, permanent flexibility to the sealant. Polyisobutylene and polybutene are representative of such plasticizers. A polyisobutylene plasticizer is available commercially as Vistanex ® LMMS sold by Exxon. Preferred compositions will utilize a plasticizer in amounts of 1–3% by weight.

A stabilizer (antioxidant) may be utilized to guard against thermal/oxidative breakdown of the block copolymer during manufacture of the sealant, application and performance life in the cable. In some instances where the potential for thermal/oxidative breakdown of the copolymer is known to be relatively small, the stabilizer is included merely for an additional level of protection. Preferred sealants will contain from 0.1 to 0.5% of a hindered phenol stabilizer. Among various classes of useful stabilizers, the most useful stabilizers are high molecular weight hindered phenols. Representative hindered phenols include: 1,3-5-trimethyl-2,4-6-tris(3,5-di-tert-butyl-4-hydroxybenzyl)benzene; pentaerythrityl tetrakis-3(3,5-di-tert-butyl)-4-hydroxyphenyl)-propionate; n-octadecyl-3(3,5-di-tert-butyl-4-hydroxyphenyl)propionate; 4,4'-thiobis(6-tert-butyl-o-cresol); 2,6-di-tert-butylphenol; 6-(4-hydroxyphenoxy)2,4-bis (n-octylthio)-1,3,5-triazine; 2,4,6-tris(4-hydroxy-3,5-di-tert-butyl-phenoxy)-1,3,5-triazine; di-n-octadecyl-3,5-di-tert-butyl-4-hydroxy-benzyl-phosphonate; 2-(n-octylthio)ethyl-3,5-di-tert-butyl-4-hydroxy-benzoate; and sorbitol hexa-[3-(3,5-di-tert-butyl-4-hydroxy-phenyl) propionate].

The performance of these stabilizers may be further enhanced by utilizing, in conjunction therewith synergists such, for example, as thiodipropionate esters and phosphites.

Additional smoke suppressant properties may be given to the sealant by including small amounts smoke suppressant additives such as zinc borate, ammonium octamolybdate and magnesium distearate. Basic magnesium carbonate (sometimes used as a partial replacement for magnesium hydroxide) may also be used. Such additives when used will preferably be used in amounts of 0.5–1.0%.

The sealant compositions may be prepared using process techniques known in the art. An exemplary procedure where equal parts of ATH and magnesium hydroxide are used involves placing a first charge of all of the block copolymer and stabilizer (if employed), a small portion of the ATH (about one-seventh of the total ATH) and a small portion of the petroleum or mineral oil (about one-fifth of the total petroleum or mineral oil) into a heavy duty, jacketed mixer, preferably of a Baker Perkins type, which mixer is equipped with sigma blades affording high shear. The mixer should be preheated to a temperature of about 270°-300° F. (132°-149° C.) and maintained within that range throughout the procedure. It is important that the blades provide a good shearing action to the mixing components. After mixing for an initial two hours, a second charge is added to the mixer. In this charge, separate components of ATH and magnesium hydroxide are added (each in amounts of about one-seventh of the total employed) as well as all of the plasticizer, and other additives if employed. Mixing is continued for about 30 minutes after the second charge is added after which a third charge is added which comprises about two-sevenths of ATH and, separately, about two-sevenths of magnesium hydroxide and about one-quarter of the total petrolatum or mineral oil. Mixing is continued for about 30 minutes after which a fourth charge is added which comprises about one-half of the total amount of ATH and a portion of magnesium hydroxide, about one-tenth of the total amount, and another quarter of the total amount of petrolatum or mineral oil. Mixing is continued for another 30 minutes after which a final charge of the remaining amount of magnesium hydroxide (about four-sevenths) and the remaining petrolatum or mineral oil is added to the mixer. Mixing is continued for an additional 45 or 60 minutes or until the sealant exhibits a homogenous, cohesive texture at which time heating and mixing are discontinued and the sealant is removed from the mixer and is ready for storage or use.

The practitioner will recognize that some variations in the described procedure can be tolerated. The more important aspects of the procedure involve employing multiple charges of the smoke suppressant and petrolatum or oil components in order that the sigma blades provide a useful shearing action to copolymer component. Moreover, mixing temperatures above about 160° C. are to be avoided in order to insure that no decomposition of the ATH component occurs.

Smoke Index Test Procedure

The test procedure used in evaluating the smoke index of the sealants prepared in the examples in the Naval Engineering Standard (NES) 711. In this test, plaques of the sample sealant are provided measuring about 3 inches by 3 inches and 70 mils in thickness.

Each plaque is placed in an NBS smoke density test chamber and exposed to standard thermal conditions of pyrolysis and combustion in a continuous (18 minute) procedure. The change in optical density of the smoke produced by the heated plaque when dispersed within a fixed volume of air is recorded throughout the period of the test. The resulting density/time curve is used to calculate the smoke index.

EXAMPLE I

A smoke suppressant sealant was prepared using the components and amounts shown in Table I below. The amounts shown are parts by weight to total 100 parts.

The sealant was prepared in a sigma blade mixer heated to 270°-300° F. by blending/shearing the components according to the general procedure described above.

TABLE I

|  | A |
| --- | --- |
| Kraton G 1652* | 4.1 |
| stabilizer (hindered phenol) | 0.2 |
| ATH (aluminum trihydrate) | 37.6 |
| Magnesium hydroxide (Zerogen 30F)** | 37.6 |
| Polyisobutylene | 2.3 |
| Petrolatum | 17.6 |
| Ammonium octamolybdate | 0.6 |

*Kraton G 1652 is a styrene-ethylene-butylene-styrene block copolymer available from shell Chemical company.
**Solem Industries.

Sealant A was evaluated for various properties, including extrudability, comparing it with another sealant which is available commercially from National Starch and Chemical Company under the DURIBBON® trademark. The commercial sealant utilizes a similar styrene containing hydrogenated block copolymer but uses a smoke suppressant composition of ATH and calcium carbonate filler in place of the ATH and magnesium hydroxide combination used in the sealant herein. Both sealants provided a homogeneous, cohesive and flexible mass. However, only sealant A was able to pass the smoke index requirement having a smoke index of 32.72, while the comparative sealant exhibited a smoke index above 50. Military specifications Mil-C-0024643 require a smoke index below 45.

Both sealants were easily extrudable at temperatures from 200°-250° F. and showed good processability in use in cable production.

EXAMPLE II

Two additional smoke suppressant sealants representative of the sealants of the invention were prepared using components and amounts shown in Table II below. The amounts shown are parts by weight of total 100 parts. The sealants were prepared according to the procedure of Example I.

TABLE II

|  | B | C |
| --- | --- | --- |
| Kraton G 1102 | 4.23 | — |
| Septon 2002** | — | 4.42 |
| Stabilizer (hindered phenol) | 0.18 | 0.19 |
| ATH | 38.72 | 40.43 |
| Magnesium hydroxide | 38.72 | 40.43 |
| Shellflex 371 (naphthenic oil) | 15.13 | 11.37 |
| Polyisobutylene | 2.40 | 2.53 |
| Ammonium octamolybdate | 0.62 | 0.63 |

*Kraton G 1102 is a styrene-butadiene-styrene block copolymer
**Septon 2002 is a styrene-ethylene-propylene-styrene block copolymer.

Both sealants provided a homogeneous flexible and pumpable mass while exhibiting acceptable cohesive strength.

EXAMPLE III

Additional sealant compositions which meet the NES-711 smoke index requirements can be prepared with components and amounts as shown below in Table II.

TABLE II

|  | D | E |
| --- | --- | --- |
| Kraton G-1650 | 3.0 | 6.0 |
| Kraton G-1652 | 6.0 | — |
| Stabilizer (hindered phenol) | 0.2 | 0.2 |
| ATH (alumina trihydrate) | 25.0 | 52.0 |
| Magnesium hydroxide | 50.0 | 26.0 |
| Mineral oil | 14.8 | 2.8 |
| Polybutene | 1.0 | 3.0 |
| Petrolatum |  | 10.0 |

The specific embodiments described above are given by way of example only and the scope and spirit of the invention are to be limited only by claims and not by the foregoing specification.

What is claimed is:

1. A water tight, electrical power cable which includes a non-halogenated pumpable sealant composition consisting essentially of:
    (a) 3 to 10% by weight of a styrene-containing hydrogenated diblock and/or triblock copolymer,
    (b) 70 to 82% by weight of a smoke suppressant composition,
    (c) 10 to 20% by weight of petrolatum or mineral oil,
    (d) from 0 to about 3% by weight of an organic plasticizer for the block copolymer,
    (e) from 0 to about 0.5% by weight of a stabilizer,
    (f) from 0 to about 5% by weight of a smoke suppressant additive, wherein the smoke suppressant composition comprises a combination of alumina trihydrate and magnesium hydroxide in proportions of 4:1 to 1:4, and said sealant composition exhibits a smoke index of less than 45.

2. The electrical power cable of claim 1 wherein the sealant contains from 14 to 18% by weight of petrolatum or mineral oil.

3. The electrical power cable of claim 2 wherein the sealant contains from 4 to 6% by weight of the styrene-containing hydrogenated diblock and/or triblock copolymer.

4. A water tight, electrical power cable which includes a non-halogenated pumpable sealant composition which comprises:
    (a) 4 to 6% by weight of a styrene-ethylene-butylene-styrene diblock and/or triblock copolymer,
    (b) 70 to 82% by weight of a smoke suppressant comprising a combination of alumina trihydrate and magnesium hydroxide in a proportion of 2:1 to 1:2,
    (c) 14 to 18% by weight of petrolatum or mineral oil,
    (d) 1–3% by weight of an organic plasticizer for the block copolymer,
    (e) 0.1–0.5% by weight of a hindered phenol stabilizer and said sealant composition exhibits a smoke index of less than 45.

5. An electrical power cable sealant composition having a non-halogenated pumpable viscosity which comprises:
    (a) 3 to 10% by weight of a styrene-containing hydrogenated diblock and/or triblock copolymer,
    (b) 70 to 82% by weight of a smoke suppressant composition,
    (c) 10 to 20% by weight of petrolatum or mineral oil,
    (d) from 0 to about 3% by weight of an organic plasticizer for the block copolymer,
    (e) from 0 to about 0.5% by weight of a stabilizer,
    (f) from 0 to about 5% by weight of a smoke suppressant additive, wherein the smoke suppressant composition comprises a combination of alumina trihydrate and magnesium hydroxide in proportions of 4:1 to 1:4, and said sealant composition exhibits a smoke index of less than 45.

6. The electrical power cable sealant composition of claim 5 wherein the smoke suppressant composition comprises a combination of alumina trihydrate and magnesium hydroxide in a proportion of 2:1 to 1:2.

7. The electrical power cable sealant composition of claim 6 wherein the sealant contains from 14 to 18% by weight of petrolatum and a smoke suppressant additive comprising from 0.5 to 1.0% of ammonium octamolybdate.

8. The electrical power cable sealant of claim 5 wherein the styrene-containing diblock and/or triblock copolymer is a styrene-ethylene-butylene-styrene block copolymer.

* * * * *